United States Patent [19]
Bartera

[11] 3,879,992
[45] Apr. 29, 1975

[54] MULTIPLE CRYSTAL OSCILLATOR MEASURING APPARATUS

[75] Inventor: Ralph E. Bartera, La Canada, Calif.

[73] Assignee: California Institute of Technology, Pasadena, Calif.

[22] Filed: Dec. 8, 1971

[21] Appl. No.: 205,803

Related U.S. Application Data

[63] Continuation-in-part of Ser. No. 36,618, May 12, 1970, abandoned.

[52] U.S. Cl. .......................... 73/30; 73/23; 310/8; 310/9.8; 324/56
[51] Int. Cl. .......................................... G01n 31/06
[58] Field of Search ............... 73/30, 19, 23, 26, 27; 310/8.7, 8.9, 9.5, 9.1, 9.8, 9.7, 8; 324/56, 158

[56] References Cited
UNITED STATES PATENTS

| | | | |
|---|---|---|---|
| 3,266,291 | 8/1966 | King | 73/23 |
| 3,329,004 | 7/1967 | King | 73/23 |
| 3,431,770 | 3/1969 | Sanford et al. | 73/23 |

Primary Examiner—Richard C. Queisser
Assistant Examiner—Stephen A. Kreitman
Attorney, Agent, or Firm—Lindenberg, Freilich, Wasserman, Rosen & Fernandez

[57] ABSTRACT

Crystal oscillators are described for measuring an environmental characteristic such as the density of a particular gas, even though other characteristics such as temperature are changing that also affect the oscillator frequencies. The apparatus includes two oscillator assemblies with both of their crystal structures uncovered and close together to experience the same temperature and mass accretion, and with the crystal structures having the same mass accretion coefficient (change of frequency per unit increase in mass) but different temperature coefficients. The difference in crystal oscillating frequencies, which is due solely to temperature change since their mass accretion coefficients are equal, is monitored to determine their temperature. The frequency of either crystal at the thus determined temperature indicates its mass accretion. The fact that both crystals are uncovered means that they both respond rapidly to environmental changes, so that measurements can be made in a short time.

22 Claims, 11 Drawing Figures

PATENTED APR 29 1975　　　　3,879,992

RALPH E. BARTERA
*INVENTOR.*

BY

*Lindenberg, Freilich & Wasserman*

ATTORNEYS

MULTIPLE CRYSTAL OSCILLATOR MEASURING APPARATUS

CROSS REFERENCES TO RELATED APPLICATION

This is a continuation in part of patent application Ser. No. 36,618 filed May 12, 1970, now abandoned

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to apparatus for measuring environmental characteristics by the change in frequency of an oscillating crystal.

Extremely minute film deposits on the order of $10^{-12}$ grams per square centimeter can be measured by measuring the change in frequency of a quartz crystal oscillator when the mass is added to the crystal. This method can be used to measure the amount of condensible gases within or flowing through a chamber by measuring the mass of gas which is deposited on a quartz crystal assembly within the chamber. The crystal assembly is part of an oscillator, and mass accretions on its face lower its frequency of oscillation.

While the frequencies of quartz and other piezoelectric crystals are highly sensitive to mass loading, they are also highly sensitive to temperature changes and other environmental parameters. Thus, temperature changes which occur during mass deposition can mask small mass accretions. The sensitivity to temperature changes can be reduced by selecting quartz crystals which have been cut from the mother stone along a plane that produces an extremely low frequency-temperature coefficient over some limited temperature range. This range is often referred to as the "turnover point" because there is usually a change from a negative to a positive coefficient in this temperature range. However, it is often inconvenient or impractical to maintain such a crystal at its turnover point, and at other temperatures, temperature effects can again mask the effects of small mass accretions. Similar difficulties are encountered in attempting to cancel the efforts of other environmental parameters that affect frequency and that may be changing.

Another method which can be used to reduce temperature effects is to employ a second, highly temperature sensitive crystal to measure the temperature of the environment. The temperature-sensing crsytal can be shielded from mass accretions by encasing it in an hermetically sealed case. However, this results in delays in the sensing of temperature changes. Furthermore, this technique of shielding one of the crystals from one variable cannot be utilized where a second variable that is to be accounted for requires exposure of both crystals, as where it is desired to determine the density of a first gas in an environment where the density of a second gas varies that also affects oscillation frequency.

SUMMARY OF THE INVENTION

The present invention relates to measuring devices that use two or more crystal structures to determine the variation of an environmental characteristic or parameter while another environmental parameter that also affects oscillation frequencies is changing. An important feature of the invention is that all of the crystal structures are exposed to the environmental changes, rather than one of them being hermetically sealed or otherwise isolated. However, the crystal structures are formed so that, while they all may be sensitive to all of the varying environmental parameters, the ratio of sensitivity to the parameters is different for the different crystal structures. The level of each parameter can be determined essentially by solving simultaneous equations. By exposing all of the crystal structures of a group to all of the parameters, it is possible to more rapidly detect changes and to differentiate more parameters than has been possible heretofore.

In accordance with one embodiment of the invention, crystal oscillator apparatus is provided which enables the rapid measurement of minute mass accretions that change the frequencies of oscillating crystals, by permitting the offsetting of temperature effects that also affect frequency. The apparatus includes two quartz crystal assemblies positioned side-by-side, both crystal assemblies being fully exposed so they experience the same temperature and mass accretions. Each crystal assembly is coupled to a different oscillator circuit that measures its frequency of oscillation, and the difference in frequency between the two crystals is also measured. The crystals have identical mass coefficients but different temperature coefficients, so that any change in their difference frequency is due solely to change in temperature. Accordingly, the temperature of the crystals is known at every time. Knowledge of the temperature of a crystal at any time, allows for the offsetting of any frequency change due solely to change in temperature, so that the amount of frequency change due solely to mass accretion can be accurately determined. Thus, the amount of mass accretion can be determined.

The crystal structures, or crystals, are first calibrated to measure their frequencies at various temperatures, in the absence of mass accretions, and also to determine their frequency differences at various temperatures. The mass accretion coefficient of the crystals at any temperature within a large range is known from previous tests on the material. The crystal pair is then placed in the environment containing a gas which is deposited on the crystals in an amount dependent on the density of the gas. The temperature of the crystals is determined by noting their difference in frequency. The mass accretion on either crystal is then determined by noting the difference between the actual frequency of that crystal and the frequency that the crystal would have at that temperature in the absence of any mass accretion.

The crystal pair also can be used to measure temperature in an environment where material may be deposited on the crystals. The temperature is indicated by the difference in frequency of the crystals, any frequency changes due to mass accretion being the same for both crystals and therefore not affecting the difference. The use of uncovered crystals results in fast response to temperature changes.

Other embodiments of the invention enable the measurement of other environmental parameters where two or more of such parameters are changing. For example, three identical underlying crystals may be used that are respectively coated with an inert material such as gold, a layer of aluminum oxide, and a polymer layer of silica gel. The first crystal assembly with the inert coating is sensitive only to temperature. The second and third coatings absorb both water and carbon dioxide, so that these two crystal assemblies are affected by the density of water vapor and the density of carbon dioxide. However, the second coating is proportionately more absorbant of $CO_2$ and therefore the second crystal assembly is more sensitive to $CO_2$ than the third. This enables a determination of the temperature, density of water vapor and density of $CO_2$. All three crystal assemblies are exposed to the environment, so that all react quickly to changes in the environment.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
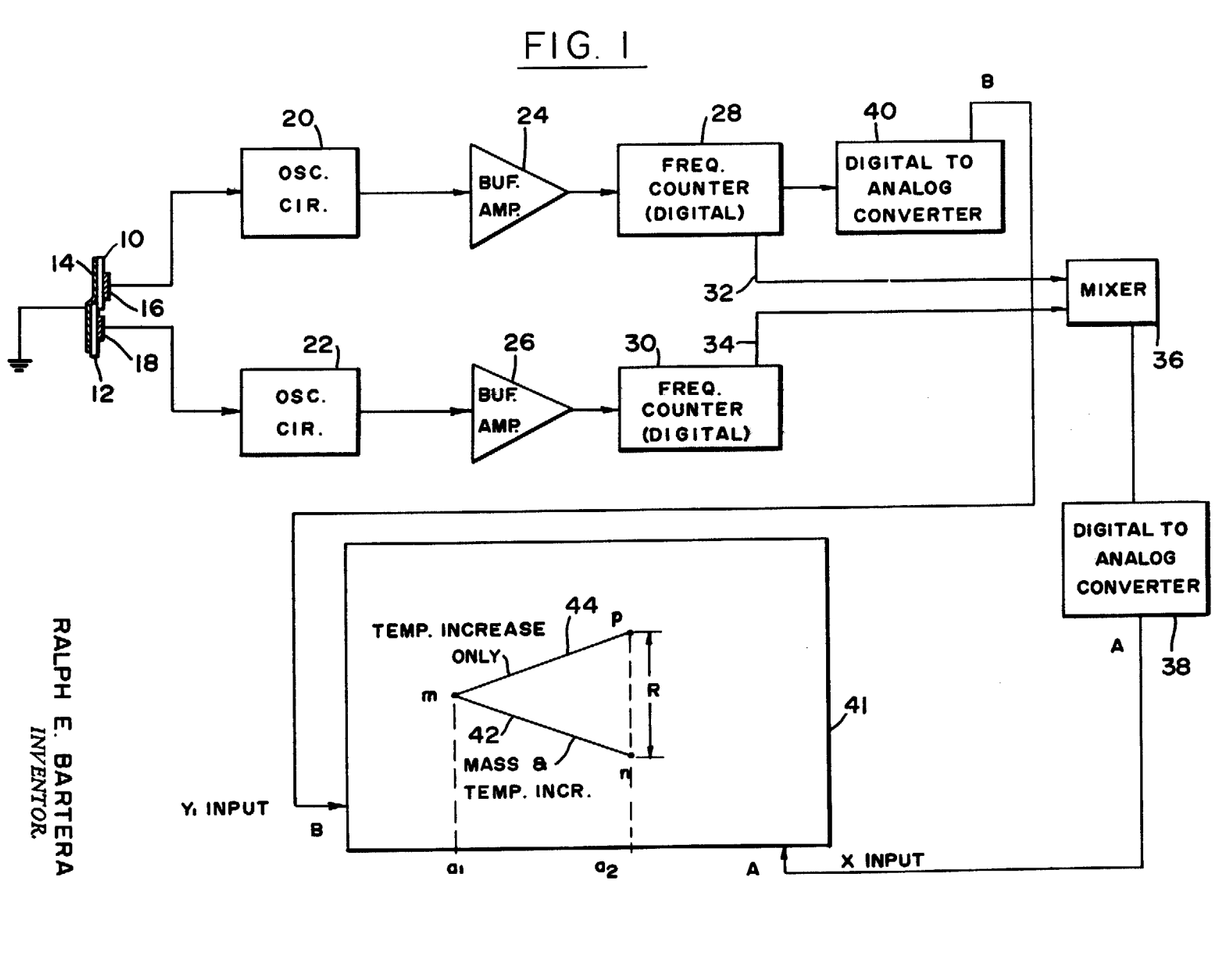
FIG. 1 is a block diagram of measuring apparatus constructed in accordance with the invention.

FIG. 1 illustrates apparatus which can measure mass accretions comprising two slabs of crystal 10 and 12, each of whose frequency of oscillation is dependent upon its mass and temperature. A common electrode 14 lies on the rear face of each crystal, and an individual electrode 16, 18 lies on the front face of each crystal. The crystals are coupled through their electrodes to a separate exciting or oscillator circuit 20, 22 (the front electrode 14 is grounded to couple it to a grounded terminal — not shown — of each oscillator circuit). The oscillator circuits 20, 22 oscillate at frequencies dependent upon the crystals 10, 12. The crystals 10, 12, may be placed in an environment where material may be deposited on them, and the circuit is designed to enable an accurate measurement of the deposited mass regardless of the fact that the crystals may also undergo a temperature change. The slabs of crystal 10, 12 have different temperature coefficients, but the electrodes 16, 18 are indentical and have the same mass accretion coefficients (change in frequency per unit change in deposited mass).

The oscillations of the circuits 20, 22 are delivered through buffer amplifiers 24, 26 to digital frequency counters 28, 30. One output 32, 34 of each digital counter is delivered to a mixer 36 which derives a difference frequency. The difference frequency is delivered through a digital-to-analog converter 38 which produces an analog signal A proportional to the difference in oscillation frequencies of the crystals 10, 12. One of the digital counters 28 also delivers its frequency count to an analog-to-digital converter 40 that provides analog signals B proportional to the frequency of oscillation of crystal 10. Thus, two analog signals A and B are produced which are proportional, respectively, to the difference frequency between the two crystals and the frequency of the first crystal 10. (It should be understood that by the term "proportional" it is meant that the changes are proportional).

The two analog signals A and B are applied to an X-Y plotter 41 to produce graphs 42 and 44 that show the relationship between the difference frequency A and the frequency B of one crystal 10. The graph 42 extends from point $m$, where the difference frequency is $a_1$, to point $n$, where the difference frequency is $a_2$. This graph 42 represents the change in frequencies of the crystals due to changes in both temperatures and mass. In order to isolate the portion of frequency changes due solely to change of mass, a previous calibration graph 44 should have been made. The graph 44 represents the change in frequency B of crystal 10 versus the change in frequency difference A between the two crystals, when there is no mass accretion. A portion of this calibration graph 44 is shown which extends between the point $m$ and a point $p$, point $p$ lying at the same frequency difference value $a_2$ as point $n$. The difference R in frequency of crystal 10 at points $p$ and $n$ represents the change in frequency due to mass accretion. The mass accretion coefficient (change in frequency per unit change in mass at constant temperature) is known, so the change R in frequency allows a calculation of mass that has been deposited on the crystal. The mass change equals the frequency change R divided by the frequency-mass coefficient.

It may be noted from graph 44 that the crystal 10 has a positive temperature coefficient, i.e., its frequency of oscillation increases as its temperature rises. Also, graph 42 shows that the crystal has a negative mass accretion coefficient, i.e., the frequency of oscillation decreases as mass is deposited on its face, so that the frequency of oscillation of crystal 10 would have declined to a lower level if there had been no temperature rise. The mass accretion coefficient is always negative for the crystals and is the same for crystals of the same size and material. A typical quartz crystal with a one square centimeter active area on its face that oscillates at a nominal frequency of 10 megahertz, will have a mass sensitivity of about $10^{-8}$ grams per hertz, or in other words, a frequency-mass coefficient of $10^8$ hertz/gram.

The temperature coefficient of quartz crystals can be positive or negative, and depends upon the optical plane along which the crystal was cut from the mother stone. A quartz crystal representing a cut along the Y plane will have a temperature coefficient of approximately +0.001 frequency change per degree centigrade (PPM/°C) at cryogenic temperatures (e.g. about −200°C), or in other words, a 10 megahertz crystal will have a frequency temperature coefficient of $10^4$ hertz/°C. A crystal representing a cut along the BT plane will have a temperature coefficient of approximately −200 PPM/°C, or $-2 \times 10^3$ hertz/°C. The temperature coefficient actually varies, so that the graph 44 would be nearly straight for only small temperature changes.

Figures 2, 3, 4:
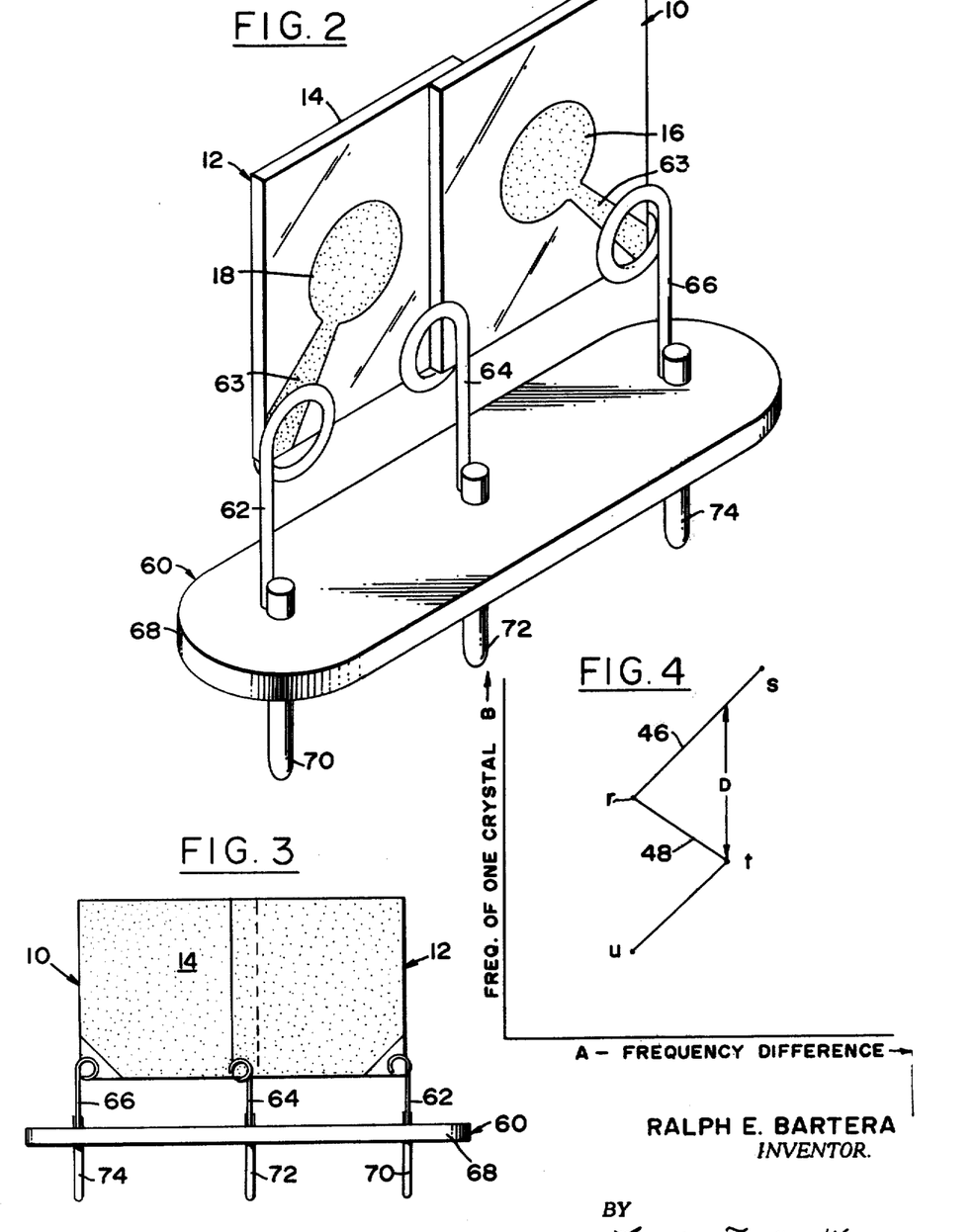
FIG. 2 is a perspective view of the crystal portion of the apparatus of FIG. 1.
FIG. 3 is a front elevation view of the crystal apparatus of FIG. 2.
FIG. 4 is a typical plot made by the apparatus of FIG. 1.

FIG. 4 illustrates the graphs that may be produced during operation of the apparatus of FIG. 1, by plotting the frequency B of one crystal against the frequency difference A between the two crystals (which indicates temperature). First, a calibration graph 46 is obtained by heating the dual crystal structure, in the absence of material that may accumulate on the crystals, so that the plotting pen moves from point r to point s. With the crystals at a cryogenic temperature, a small radiant source such as a small light bulb may be used while the mass accretion source is turned off. The crystals are then allowed to cool back to ambient temperature, so that the plotting pen returns to point r. The dual crystal structure is heated again, but this time by reason of the deposition of material on the crystals, in order to measure the amount of such material. The pen then moves from point r to point t, drawing the line 48. As previously pointed out, the vertical distance D from point t to a point on the graph 46 is a measure of frequency change due solely to mass accretion. This can be used to determine mass accretion by dividing the frequency difference D by the coefficient of frequency-mass accretion. It may be noted that after the mass has been deposited on the crystal, cooling of the crystal back to ambient temperature will result in the pen moving to a point u.

With the pen at point u, which represents the cooled crystal pair with some mass deposited thereon, a new calibration curve can be drawn (which passes through points u and t), and then another measure of mass can be made. If too much mass is allowed to be deposited on the crystals, the temperature or mass accretion coefficients become too non-linear or the crystals may cease to oscillate. The crystals may be restored to their orginal condition by heating the crystal structure to evaporate the deposits thereon. When the crystal structure cools, it will return along the line 46 to point r.

In some cases, it is desirable to measure the frequency of both crystals, to corroborate the results. This is accomplished by using the circuit of FIG. 1, and by coupling the output of the frequency counter 30 to a digital-to-analog converter to obtain an analog signal proportional to the frequency of crystal 12. This frequency also can be plotted against the difference frequency by the use of a dual pen plotter. Of course, it is not necessary to obtain results by plotting. The circuits can be simplified by repeatedly noting the frequencies of counters 28 and 30, and manually subtracting one from the other to determine the difference. The difference frequency can then be divided by the coefficient of frequency-mass accretion to determine the deposited mass. On the other hand, the substracting and multiplying (using the inverse of the coefficients) can be accomplished automatically by circuits well known in the art, if it is desired to obtain mass accretion indications automatically.

In many situations, it is desirable to obtain temperature measurements under conditions wherein mass may be deposited on any unsealed crystal. Quartz crystal oscillators are useful to sense temperature, inasmuch as they enable temperature resolutions of about 0.001°F. The crystal can be shielded from mass deposition by encasing it, but this increases the thermal response time to several seconds. An uncased crystal has a faster response, but is subject to changes in frequency caused by mass accretion. However, by using the dual crystal structure described above, mass accretion effects can be cancelled, to enable temperature to be measured.

Temperature measurements can be made using the dual crystal structure, by using only the frequency difference signal A, and by calibrating the frequency difference to actual temperature. As previously mentioned, mass accretions cause the same frequency change in both crystals, and therefore do not affect the frequency difference. By using the difference signal, and previous calibrations that show the temperature at every frequency difference, the invention provides an extremely fast response quartz crystal thermometer.

The use of uncovered crystals enables the measurement of phenomena not readily measurable heretofore. For example, a large part of the heat flux to which an uncovered crystal is exposed when mass accretion takes place, is due to the heat of condensation. The dual uncovered crystal structure allows measurements of the heat of condensation of various condensible materials, by allowing temperature measurements to be taken in the presence of mass accretions. The structure also can be used in investigating chemical reactions, such as the interaction between the solid phase of a given material and a gas passed over the crystal. In such reactions, both the mass change of the solid reactant and the temperature change due to the heat of reaction an be determined directly and continuously. This has not been possible before. It may be noted that mass accretion, or the depositing of material on a crystal surface, may occur by condensation, as where a vapor of metal or other material encounters a crystal surface (such as the surface of the electrode) which is at a temperature below the freezing or condensation temperature of the vapor, by physical absorption into a coating on the crystal which can absorb the vapor, or by chemical reactions or absorption with a coating on the crystal.

A dual crystal structure of the type illustrated in FIG. 2 can be constructed using two crystals that oscillate about 10 megahertz. For oscillations at temperatures down to about 14°K, it is generally easiest to construct crystals that oscillate at a frequency between 2 megahertz and 20 megahertz, so a 10 megahertz rate may be chosen. The crystals can be joined in a butt or lap joint to provide a good mechanical and thermal connection of their edge portions the overlapping in the case of a lap joint perferably being a small amount such as 5 to 15% of the width of the crystals. The crystals are constructed so that the front electrodes 16, 18 cover only a central crystal area that is spaced from the lap joint. In a disc type crystal, mass deposited outside the central region between the front and back electrodes has a minor effect on frequency compared to mass deposited on the central region. Thus, a mass accretion near the lap joint has only a minor effect. In order to equalize the effective mass accretion coefficient, however, the crystal 10 which is covered along the lap joint may be constructed slightly larger, to provide it with the same exposed area on its back surface. The crystals may be joined with a cement.

The back electrode 14 is a continuous film deposited on the crystals, and it covers the entire back area except at the lower corners of the pair. In some situations, however, the back electrode is formed as descrete arms to obtain more complete electrical isolation of the crystals. As also shown in FIG. 3, the crystal pair is supported by a mount 60 that includes three holders 62, 64 and 66. Each of the holders has a lower end held on a base 68 and an upper end for clamping onto a crystal structure. The two end holders 62, 66 electrically contact legs 63 of the front electrodes 18, 16 of the crystals. The center holder 64 electrically contacts the back electrode 14. The holders contact electrical pins 70, 72, 74 on the base, the pins being inserted in a socket for connection to the rest of the circuit.

It is generally simpler if the two crystals 10, 12 are constructed to have approximately the same frequency of oscillation, and mass accretion coefficient. However, this is not necessary so long as both crystals experience the same temperature and the same ratio of mass accretion. The change in frequency of two crystals a and b is then given by the equations:

$$\Delta f_a = \Delta t\, T_a + \Delta m\, M_a$$

$$\Delta f_b = \Delta t\, T_b + \Delta m\, M_b$$

where $f_a$ and $f_b$ are the changes in frequency of the crystals $a$ and $b$, $T_a$ and $T_b$ are the temperature coefficients (change in frequency per unit change in temperature), $M_a$ and $M_b$ are the mass accretion coefficients (change in frequency per unit change in mass), $\Delta t$ is the change in temperature, and $\Delta m$ is the change in mass of the crystals (the mass change of the crystals is assumed to be the same or at a constant ratio). The coefficients $T_a$, $T_b$, $M_a$ and $M_b$ are all known, and the frequencies $\Delta f_a$ and $\Delta f_b$ can be measured. Thus, the only two unknowns, $\Delta t$ and $\Delta m$ can be calculated from the two equations, so long as $T_a/T_b$ does not equal $M_a/M_b$.

The apparatus therefore enables the measurement of mass accretion in the presence of temperature change, and the measurement of temperature changes in the presence of mass accretion, with very small response time and in apparatus of the crystal oscillator type which permits high sensitivity. These measurements are enabled by the use of a pair of crystals maintained in thermal contact to experience the same temperature changes, and positioned to experience the same or a constant effective ratio of mass changes. While quartz crystals are readily available for use as the oscillating device, other material which oscillates at a frequency which remains very stable in the absence of temperature and mass changes, can be used by mounting electrodes on them to use them as the crystal means.

Figure 5:
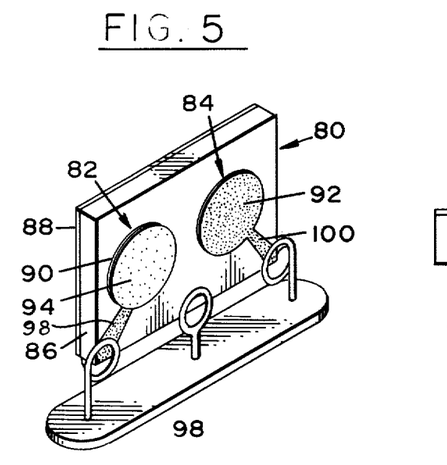
FIG. 5 is a perspective view of crystal apparatus constructed in accordance with another embodiment of the invention.
Figure 6:
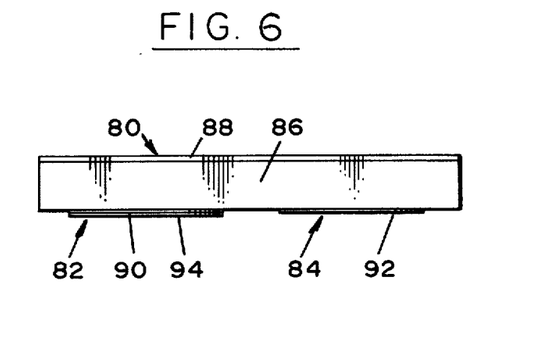
FIG. 6 is a plan view of the apparatus of FIG. 5, with some thickness dimensions being exaggerated for clarity.

FIGS. 5 and 6 illustrate another type of crystal device 80 which employs two crystal means or structures 82, 84 utilizing different regions of the same uniform slab of quartz crystal 86. A common electode 88 is deposited on a back face of the crystal slab while two electrode regions 90, 92 are deposited on a front face of the crystal slab. A film 94 of suitable absorbtion material such as aluminum oxide is deposited over the electrode 90 to physically absorb certain vapors in the environment. The electrodes 90, 92 are of inert material, so the crystal structure 84 does not physically absorb the vapors. Inasmuch as the crystal material vibrates primarily in thickness shear, and it has a small thickness compared to the diameters of the electrodes 90, 92 each electrode area defines a different crystal structure that can vibrate at a different frequency than the other. The electrodes are deposited with leads at 98, 100 to facilitate electrical connections thereto, so that currents can be conducted for oscillating te the structures.

The dual structure assembly 80 can be utilized to measure the partial pressure of a gas such as carbon dioxide which is absorbed by the film 94, even if the temperature of the environment is changing. This is because any changes in temperature affect both crystal structures 82, 84 by the same amount, while any changes in the partial pressure of the absorbable gases affects only the crystal structure 82. The plotting apparatus described above or computing circuitry such as that in a properly programmed computer can be utilized to determine the temperature and partial pressure of the gas. While a combination of an inert surface on one crystal structure and an absorbable surface portion on the other is suitable, it is also possible to use two differnt thicknesses of absorbable material, such as a 1000 angstrom thickness of aluminum oxide on one electrode 90 and a 2000 angstrom thickness on the other electrode 92. The different coating thicknesses would cause both crystal structures to be affected by vapor, but the structure with the thicker coating would be affected proportionately more by vapor than temperature changes as compared to the other crystal structure.

The use of a single slab of crystal 86 facilitates manufacture of the structure and helps insure uniform temperature and temperature sensitivity. While single slabs of crystal may be uniform, there are some naturally occuring crystals that can be cut so that portions on opposite sides of a line running along the slab have different temperature coefficients, so that it is possible to utilize crystal structures with different temperature coefficients even though they are on the same slab of crystal.

Figure 7:
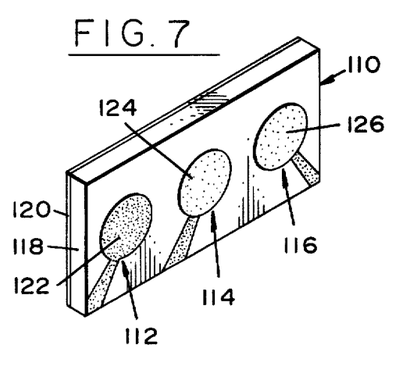
FIG. 7 is a perspective view of crystal apparatus constructed in accordance with another embodiment of the invention.

FIG. 7 illustrates another crystal assembly 110 which can be utilized to measure temperature, the density of carbon dioxide, an the density of water vapor in the environment, where these are the major variables. This is accomplished by utilizing three crystal structures 112, 114 and 116 that have three different surface portions. All of the crystal structures are formed on a single slab 118 of uniform crystal material with a common electrode 120 on the back face thereof (of course, non-integral back electrodes can be used), and with three small electrode regions on the front face of the slab. The first structure 112 has an uncoated electrode of an inert material such as gold, so that its surface 122 does not physically absorb water vapor or carbon dioxide. The second structure 114 has a film 124 of aluminum oxide that absorbs water vapor and carbon dioxide. The third, crystal structure 116 has a film 126 of silica gel which also absorbs both carbon dioxide and water vapor. Although the aluminum oxide and silica gel coatings both absorb carbon dioxide and water vapor, the ratio of absorption of the two gases for the aluminum oxide coating 124 is different than the ratio of absorption of the two gases for the silica gel coating 126. A comparison of the frequency changes of the three crystals enables the determination of the absorptions of carbon dioxide and of water vapor, as well as of temperature. Of course, where there may be other constituents that are also absorbed by the aluminum oxide and silica gel, additional crystal structures may be used that have different coatings to account for the effects of the other constituents or to measure their concentrations.

Figure 8:
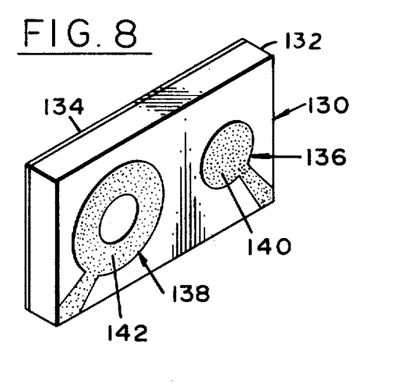
FIG. 8 is a perspective view of crystal apparatus constructed in accordance with another embodiment of the invention.
Figure 9:
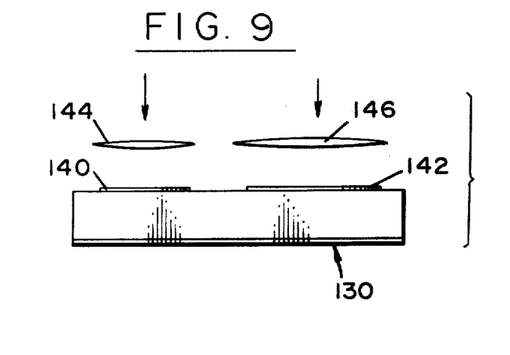
FIG. 9 is a side elevation of a detector instrument utilizing the crystal apparatus of FIG. 8.

In the crystal structures described above, the steady state conditions of the structures are generally measured, and the use of naked or uncovered crystals (but they may be coated) enables the rapid attainment of equilibrium with the environment. In some applications, crystal structures can be utilized which have different transient responses to changes, even through their steady state responses may be the same. FIGS. 8 – 9 illustrate apparatus that can be utilized to measure rapidly varying heating radiation. The apparatus includes a multiple crystal structure 130 formed by a slab 132 of quartz crystal with an electrode 134 on its front surface. The apparatus includes two crystal structures 136, 138 which have different transient responses to heating radiation incident thereon. One of the structures 136 has a substantially circular electrode 140 while the other structure 138 has a ring shaped electrode 142. These different electrode shapes cause different frequency responses to similar thermal gradients within the crystal material. The crystal apparatus 130 can be mounted in a sensor of a type shown in FIG. 9, which includes two concentrating lenses 144, 146 that forms two images, one on the electrode 140 and the other on the electrode 142. The energy in the images heats both crystal structures, but one of them will undergo a different frequency change than the other. Any drift in frequency of both crystals indicates heating or cooling of the entire assembly, while any difference in frequency of the crystals indicates a change in the image intensity of the two crystal structures. Thus, the dual crystal structure assembly can be used to cancel out effects such as the change in the temperature of the room where the assembly is located.

Figures 10, 11:
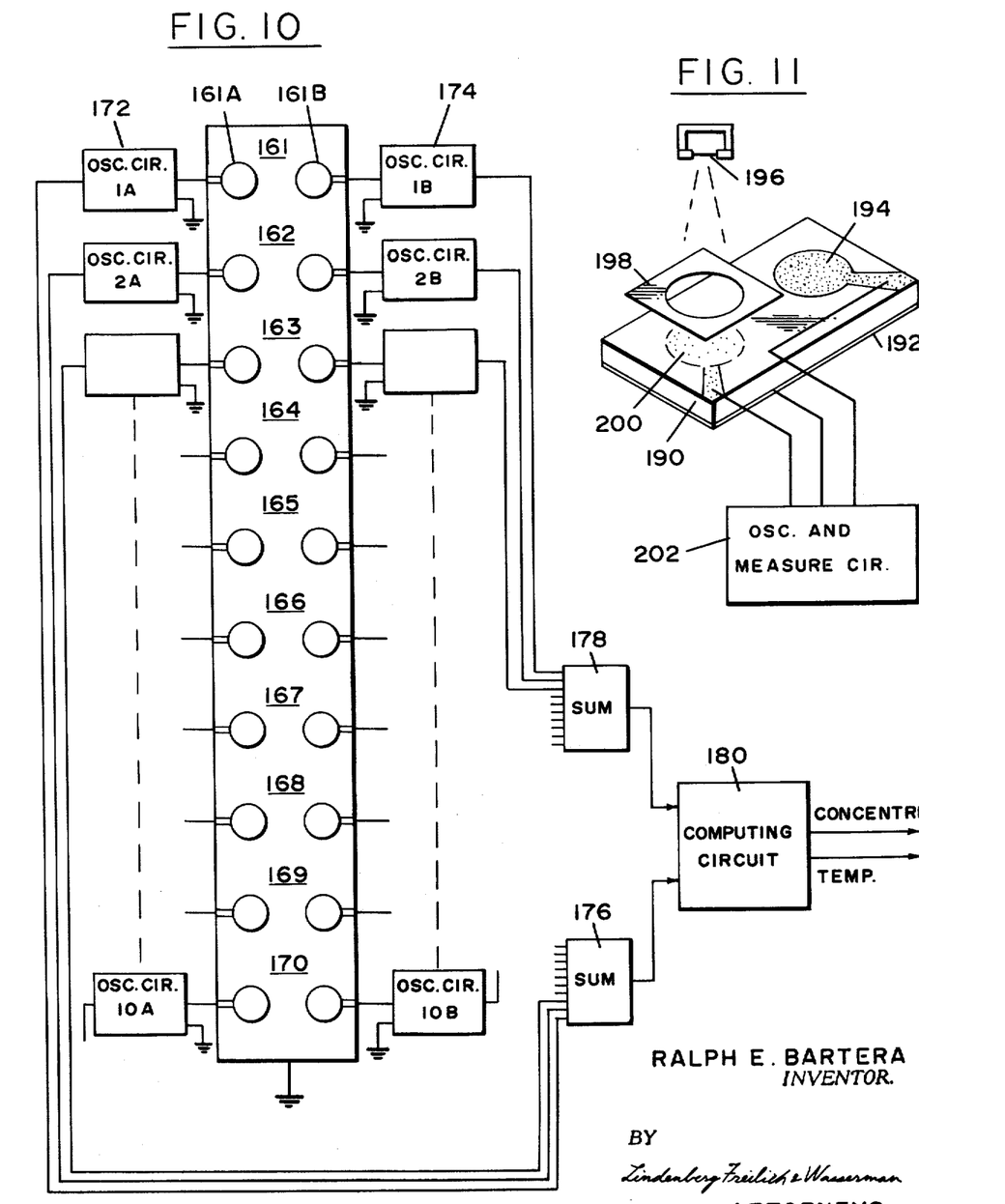
FIG. 10 is a partially plan view and partially block diagram view of a crystal oscillator instrument constructed in accordance with another embodiment of the invention.
FIG. 11 is a perspective view of a method for detecting deposition, in accordance with another embodiment of the invention.

In some situations, there is only a very small difference in frequency between two crystal structures, such as on the order of only a few hertz or less, that is, a few cycles per second or less. In order to count many cycles of frequency difference to obtain accurate readings, the measurement must be made over an extended period. For example, if the relevant frequency difference is 1 hertz, it may require 100 seconds to obtain a reading accurate to 1% where only whole cycles of frequency difference are detected. FIG. 10 illustrates an arrangement utilizing many sets of identical crystal pair structures which can be utilized to enable rapid measurements in such circumstances. The apparatus includes ten pairs of crystal structures 161 – 170, a set of ten oscillator circuits 172 for oscillating the first crystal structure of each pair and a second set of ten oscillators 174 for oscillating the second crystal structure of each pair. The sum of the frequencies of each set of ten crystal structures is obtained from summing circuits 176, 178. A computing circuit 180 compares the differences between the outputs of the two summing circuits with the sum of the summing circuit outputs or with the output of one of them to obtain two parameters, such as the density of a particular gas and the temperature of the environment. If only one crystal pair 161 were utilized, and one crystal structure 161 A of the pair oscillated at 5,000,000 hertz while the other 161 B oscillated at 5,000,001 hertz then it would require 100 seconds to obtain an accumulated oscillation difference of 100 in order to obtain a reading to an accuracy of 1% in the above example. However, by utilizing the outputs of ten crystal pairs, so that we obtain the difference between 50,000,000 hertz and 50,000,010 hertz, we are able to measure 100 cycles of frequency difference in only 10 seconds.

FIG. 11 illustrates a technique that can be employed using dual crystal apparatus, to measure the electrical impedance of a deposited material as it is being deposited. The method includes utilizing a slab of quartz crystal 190 with a common electrode 192 on the back face and a previously deposited electrode 194 on the front face. Initially, there is no second electrode on the front face, but a piece of depositable material 196 is heated so that particles of the material are emitted and pass through a mask 198 onto a region 200 at the rear face of the crystal slab. As an appreciable amount of material is thus vapor deposited on the crystal region 200, it begins to oscillate. The oscillation frequency of the crystal structure that includes the region 200 changes as additional material is deposited, the change being partly due to decreasing electrode impedance that affects the oscillation frequency of the entire oscillating circuit that includes the region 200. By utilizing a circuit 202 to measure the variation in frequency as more material is deposited on the region 200, it is possible to determine the variation in thickness and resistivity of the deposited material as it is being deposited.

The use of multiple crystal structures that are all exposed to the environment enables the accurate measurement of a wide variety of phenomena. Apparatus has been described for measuring temperature, which can change the frequency of a crystal, and for measuring the density of various absorbable gases or liquids in the environment which increases the surface mass of the crystal when they are absorbed and thereby lower the frequency of oscillation. The pressure of the environment can be measured, because variations in pressure change the thickness of the crystal and therefore its frequency. Viscosity of the environment can be measured because as the viscosity increases it increases the resistance to shear movement of the crystal faces and therefore lowers the frequency of vibration. Strain on the crystals, which may be constant, or which may vary slowly as in the case of seismic shocks, or which may vary rapidly as in the case of sound, also can be measured. Also, nuclear radiation may be measured, as where it results in alpha particles or the like being deposited in the crystal. These are only a few of the numerous environmental parameters that can be measured. The fact that all of the crystal structures may be exposed to the environment means that they can respond very rapidly to all environmental changes. This may be contrasted with situations where two crystals may be utilized but one is hermetically or otherwise sealed from the environment to isolate it from depositable gases and the like while permitting measurement of temperature, but which results in delays or inaccuracies in the measuring of temperature. Of course, the crystal structures of the present invention can be utilized together with sealed crystals to measure certain phenomena, but generally at least two of the crystal structures are fully exposed. The present invention enables the measurement of certain phenomena that cannot be readily sealed against, as in measuring $CO_2$ in the presence of water vapor where suitable materials may absorb both. The apparatus of the present invention may be considered as a way of measuring that does not isolate the phenomena affecting the crystals from one of them, but instead teaches the crystal structures to respond differently environmental factors.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. Apparatus for use in measuring temperature and mass accretion in a deposition environment by the use of oscillation circuits comprising:

first and second crystal means with surfaces, said crystal means having a ratio of frequency-temperature coefficients different from the ratios of their frequency-mass accretion coefficients;

means for holding said crystal means adjacent to one another for exposure of their surfaces to the same deposition environment, so they experience substantially the same temperature and the same mass accretion per unit area; and means for coupling said crystal means to different oscillation circuits to permit the measurement of their individual frequency changes.

2. The apparatus described in claim 1 wherein:

said first and second crystal means comprise first and second crystals joined in a lap joint so that edge portions thereof overlap, first and second back electrodes disposed at portions of said crystals which are spaced form said lap joint, and a continuous front electrode extending over the front faces of said crystals.

3. The apparatus described in claim 1 wherein:

said first and second crystal means includes first and second crystals that have edge portions in thermal contact, and a continuous film of conductive material extending between the faces of said crystals.

4. Apparatus described in claim 1 wherein:

said first and second crystal means include a pair of crystals constructed to oscillate at approximately the same frequency, said crystals having the same frequency-mass accretion coefficient and having substantially different frequency-temperature coefficients; and including first oscillator means coupled to said first crystal means;

second oscillator means coupled to said second crystal means; and means coupled to said first and second oscillator means to derive the difference between their frequencies, whereby to derive a quantity directly indicating temperature.

5. Apparatus for use in a depositing environment comprising:

first and second crystal structures having substantially the same frequency-mass accretion coefficients and different frequency-temperature coefficients; and means for mounting said crystal structures in thermal contact with each other and exposed to the ambient environment, for receiving mass accretions that can change the frequencies of oscillation of said crystals, said means for mounting including electrode means for carrying currents to said crystals to oscillate them.

6. The apparatus described in claim 5 including:

first and second oscillator means coupled to said electrode means for providing currents to said crystals to oscillate them;

means coupled to said first and second oscillator means for generating a difference signal indicating the difference between their frequencies; and plotting means having a first input coupled to one of said oscillator means and a second input coupled to said means for generating a graph showing their relationship.

7. A method for measuring the level of depositable material in an environmental comprising:

positioning first and second crystals which have a ratio of frequency-temperature coefficients different from the ratio of their frequency-mass accretion coefficients, in thermal contact with each other so they have the same temperature, and in said environment so that said depositable material can be deposited on both of them; and oscillating both of said crystals to generate first and second oscillator signals at the frequencies of oscillation of said first and second crystals, whereby to determine two frequency changes which enable calculations of temperature change or mass accretion by the solution of two simultaneous equations.

8. The method described in claim 7 wherein:

said first and second crystals have the same frequency-mass accretion coefficients and different frequency-temperature coefficients; and including deriving a difference signal proportional to the difference in frequency of said first and second oscillator signals; and plotting a graph having said difference signal as one variable and the value of one of said oscillator signals as another variable.

9. Apparatus for measuring an environmental characteristic comprising:

first and second crystal means, each having a surface portion whose temperature and mass affect the frequency of the crystal means, said crystal means having a ratio of frequency-temperature coefficient different from the ratios of their frequency-mass accretion coefficients;

means for holding said crystal means adjacent to one another for exposure of said surface portions to the same deposition environment, so they experience substantially the same temperature and a constant ratio of mass accretion;

first and second oscillation circuits coupled to said first and second crystal means respectively, to oscillate them; and means responsive to the frequency of oscillation of said first and second crystal means for indicating a characteristic of the environment of said crystal means.

10. Apparatus for measuring temperature in a depositing environment comprising:

first and second crystal means, said crystal means having a ratio of frequency-temperature coefficients different from the ratios of their frequency-mass accretion coefficients;

means for holding said crystal means adjacent to one another for exposure of surface portions of each crystal means to the same deposition environment, so they experience substantially the same temperature and a constant ratio of mass accretion;

first and second oscillation circuits coupled to said first and second crystal means, respectively, to oscillate them; and means responsive to the frequencies of oscillation of said first and second crystal means for indicating their temperature.

11. Apparatus for measuring the concentration of a component in a deposition environment comprising:

first and second crystal means, said crystal means having a ratio of frequency-temperature coefficients different from the ratios of their frequency-mass accretion coefficients;

means for holding said crystal means adjacent to one another for exposure to the same deposition environment, so they experience substantially the same temperature and a constant ratio of mass accretion;

first and second oscillation circuits coupled to said first and second crystal means, respectively, to oscillate them; and means responsive to the frequency of oscillation of said first and second crystal means for indicating the concentration of a depositable component in the environment.

12. Oscillator apparatus for measuring at least one variable environmental parameter, in an environment where at least one other parameter also changes which can also affect oscillator frequency comprising:

a plurality of crystal means with individual oscillation frequencies that vary in accordance with variations of each of a plurality of said environmental parameters, but which have different ratios of frequency sensitivities for different of said plurality of parameters;

means for supporting said plurality of crystal means for exposure of each of them to all of said plurality of parameters;

means for oscillating each of said crystal means; and means responsive to the frequencies of oscillations of said plurality of crystal means for indicating the level of at least one of said parameters.

13. The oscillator apparatus described in claim 12 wherein:

said crystal means includes a slab of oscillatory material, electrode means on a first face thereof, and first and second spaced electrodes on a second face thereof defining first and second crystal means.

14. The oscillator apparatus described in claim 12 wherein:

said crystal means includes first and second portions of oscillatory material in intimate contact, first and second spaced electrodes respectively disposed on face regions of said first and second portions of oscillatory material, and a continuous film of highly electrically and heat conductive material extending over face regions of said first and second portions of oscillatory material which are opposite said first and second electrodes.

15. The oscillator apparatus described in claim 12 wherein:

at least two of said crystal means include coatings of different absorbable material for absorbing different ratios of absorable materials form the environment.

16. The oscillator apparatus described in claim 12 wherein:

said plurality of crystal means includes multiple pairs of crystal means, a first crystal means in each pair having substantially the same first ratio of frequency sensitivities for first and second of said parameters as the first crystal means in each of the other pairs, and the second crystal means of each pair having substantially the same second ratio of frequency sensitivities for said first and second parameters as the second crystal means in each of the other pairs;

said means for oscillating includes a plurality of oscillator circuits for oscillating each of said crystal means; and said means for indicating the level of at least one of said parameters includes means coupled to all of said oscillator circuits for deriving a signal value equal to the difference between all of the oscillations of said first crystal means and all of the oscillations of said second crystal means during the same predetermined time period.

17. The oscillation apparatus described in claim 12 wherein:

said plurality of crystal means includes first and second crystal means, said first crystal means having a different ratio of sensitivity to transient applications of energy as to steady state applications of the same energy than said second crystal means.

18. Apparatus useful in measuring the concentration of a predetermined depositable material in an environment, by the use of oscillation circuits, comprising:

first and second crystal means with surfaces that can receive said depositable material, each crystal means having a oscillation frequency that varies in accordance with the concentration of said depositable material and also in accordance with the temperature of the crystal means, but the ratio of frequency-temperature coefficient to frequency-concentration of said material coefficient for said first crystal means being different than for said second crystal means; and means for holding said first and second crystal means adjacent to one another for exposure of their surfaces to the same deposition environment and so that they are both at the same temperature.

19. The apparatus described in claim 18 wherein:

said crystal means includes a single slab of crystal material with first and second spaced electrodes thereon defining said first and second crystal means, and said crystal means also includes first and second different coatings respectively disposed over said first and second electrodes fo absorbing different amounts of said depositable material.

20. A method for measuring the levels of different environmental parameters comprising:

positioning a plurality of crystal means which have different ratios of frequency-response coefficients for a plurality of different environmental parameters, so that all of said crystal means are exposed to all of the environmental parameters; and oscillating each of said crystal means to generate a plurality of oscillator signals at the frequencies of oscillation of said crystal means, whereby to determine frequency changes which enable calculations of the different parameters by the solution of a plurality of simultaneous equations.

21. The method described in claim 20 wherein:

said plurality of crystal means includes first and second crystal structures that have the same frequency-mass accretion coefficients and different frequency-temperature coefficients; and including
deriving a difference signal proportional to the difference in frequency of said first and second oscillator signals.

22. The method described in claim 20 wherein:
said plurality of crystal means include first and second crystal structures that undergo different frequency changes when a given concentration of a first substance is introduced to their environments, and that undergo different frequency changes when a given concentration of a second substance is introduced to their environment; and including
determining the frequency-change characteristics for each of said first and second crystal structures, for each of said first and second substances in the absence of the other substance;
establishing a calculating means in accordance with said frequency-change characteristics determined for each of said first and second crystal structures, which calculates the concentration of said first substances in accordance with the frequency change of said first crystal structure and as adjusted by the relative frequency changes of the first and second crystal structures; and
delivering the oscillator signals derived from said first and second crystal structures to said calculating means.

* * * * *